(12) United States Patent
Liu et al.

(10) Patent No.: US 11,968,120 B2
(45) Date of Patent: Apr. 23, 2024

(54) ADAPTIVE HIERARCHICAL SERVICE PATH SELECTION IN DYNAMIC EDGE COMPUTING ENVIRONMENTS

(71) Applicant: Cisco Technology, Inc., San Jose, CA (US)

(72) Inventors: Tong Liu, Acton, MA (US); Isha Girdhar, Uttar Pradesh (IN); Rutuja Pravin Kharche, Maharashtra (IN); Priyadarshini Anand, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/392,352

(22) Filed: Aug. 3, 2021

(65) Prior Publication Data

US 2023/0043675 A1 Feb. 9, 2023

(51) Int. Cl.
*H04L 45/00* (2022.01)
*H04L 45/02* (2022.01)
*H04L 45/24* (2022.01)
*H04L 45/645* (2022.01)

(52) U.S. Cl.
CPC .............. *H04L 45/38* (2013.01); *H04L 45/02* (2013.01); *H04L 45/04* (2013.01); *H04L 45/24* (2013.01); *H04L 45/645* (2022.05)

(58) Field of Classification Search
CPC ......... H04L 45/38; H04L 45/02; H04L 45/04; H04L 45/24
See application file for complete search history.

(56) References Cited

U.S. PATENT DOCUMENTS 9,871,719 B2 1/2018 Lee et al.
10,374,956 B1 * 8/2019 Tracy ................. H04L 67/1089
(Continued)

FOREIGN PATENT DOCUMENTS

WO 2016070670 5/2016

OTHER PUBLICATIONS

Halpern, et al., "Service Function Chaining (SFC) Architecture", online: https://tools.ietf.org/pdf/rfc7665.pdf, Request for Comments 7665, Oct. 2015, 32 pages, IETF Trust.
(Continued)

*Primary Examiner* — Philip C Lee
*Assistant Examiner* — Jihad K Boustany
(74) *Attorney, Agent, or Firm* — BEHMKE INNOVATION GROUP LLC; James M. Behmke; James J. Wong

(57) ABSTRACT

In one embodiment, a first path computation element (PCE) receives a request from a gateway for service chain functions (SFs) to be applied to a traffic flow, wherein a first subset of the SFs is located in a first zone. The first PCE identifies a boundary node located at a border between the first zone and a second zone where a second subset of the SFs are located. The first PCE sends a response to the gateway indicating a path within the first zone between the gateway and the boundary node to apply the first subset of SFs to the flow. The first PCE provides information regarding the flow and the boundary node to a second PCE that uses the information to configure the boundary node to route the flow in the second zone to apply the second subset of SFs to the flow.

18 Claims, 11 Drawing Sheets

(56) References Cited

U.S. PATENT DOCUMENTS

| | | | |
|---|---|---|---|
| 2005/0262232 A1* | 11/2005 | Cuervo | H04L 41/044 709/223 |
| 2010/0260177 A1 | 10/2010 | Wu et al. | |
| 2013/0100817 A1* | 4/2013 | Oltman | H04L 45/04 370/252 |
| 2014/0313928 A1* | 10/2014 | Fernando | H04L 45/02 370/254 |
| 2017/0353446 A1* | 12/2017 | Wetterwald | H04L 67/12 |
| 2018/0351874 A1* | 12/2018 | Abhigyan | H04L 45/34 |
| 2019/0356559 A1* | 11/2019 | Kern | H04L 41/5054 |
| 2020/0153716 A1 | 5/2020 | Nainar et al. | |
| 2020/0382420 A1* | 12/2020 | Suryanarayana | H04L 12/4633 |
| 2022/0141189 A1* | 5/2022 | Flavel | H04L 63/0272 726/15 |
| 2022/0405092 A1* | 12/2022 | Miedema | G06F 8/71 |

OTHER PUBLICATIONS

Litkowski, et al., "YANG Data Model for Segment Routing", Internet Engineering Task Force, Request for Comments 9020, May 2021, 39 pages, IETF Trust.

* cited by examiner

ADAPTIVE HIERARCHICAL SERVICE PATH SELECTION IN DYNAMIC EDGE COMPUTING ENVIRONMENTS

TECHNICAL FIELD

The present disclosure relates generally to computer networks, and, more particularly, to adaptive hierarchical service path selection in dynamic edge computing environments.

BACKGROUND

Distributed cloud networking, to provide a variety of applications, has increasingly required the use of multiple edge computing nodes to facilitate service function chaining, load balancing, and availability zoning. However, service placement (e.g., determining where certain applications may be located at edge computing nodes) and path selection for service function chaining (e.g., how a flow of traffic may be serviced by applications run by the edge computing nodes as it traverses a network) can be overwhelmingly complex due to numerous factors. These factors include a very large number of compute nodes as well as dynamic operation conditions, especially in mobile edge computing environments.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
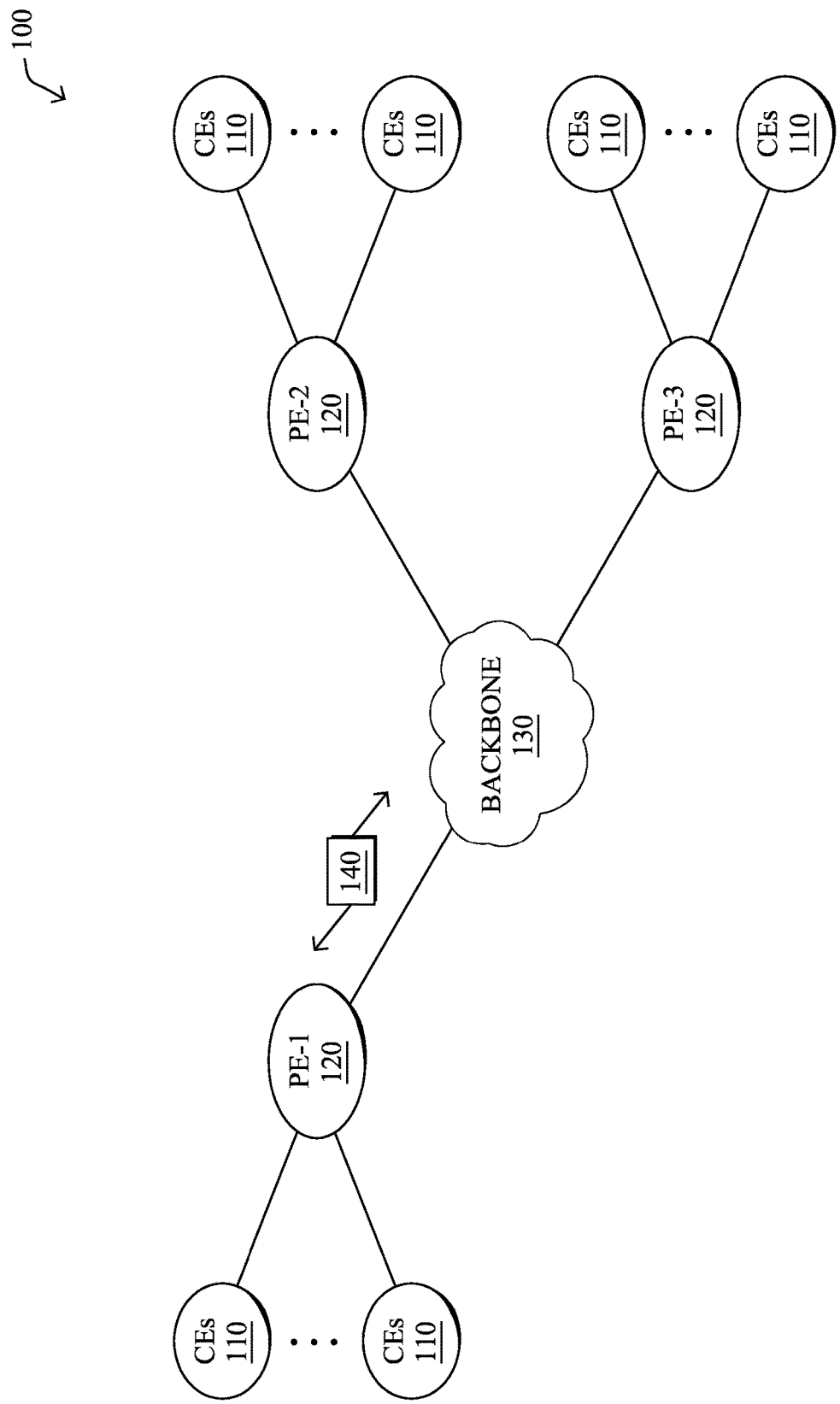
FIGS. 1A-1B illustrate an example computer network.

According to one or more embodiments of the disclosure, a first path computation element receives a request from a gateway for service chain functions to be applied to a traffic flow, wherein a first subset of the service chain functions is located in a first zone. The first path computation element identifies a boundary node located at a border between the first zone and a second zone in which a second subset of the service chain functions are located. The first path computation element sends a response to the gateway indicating a path within the first zone between the gateway and the boundary node to apply the first subset of service chain functions to the traffic flow. The first path computation element provides, to a second path computation element, information regarding the traffic flow and the boundary node, wherein the second path computation element uses the information to configure the boundary node to route the traffic flow in the second zone to apply the second subset of service chain functions to the traffic flow.

DESCRIPTION

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example network 100 illustratively comprising nodes/devices, such as a plurality of routers/devices interconnected by links or networks, as shown. For example, routers 110 located at a customer edge (CE) may be interconnected with routers 120 that are at a provider edge (PE) (e.g., PE-1, PE-2, and PE-3) in order to communicate across a core network, such as a network backbone 130 that is illustrated. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router of the routers 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router of the routers 110 connected to PE-2 and a second CE router of the routers 110 connected to PE-3.

Figure 1B:
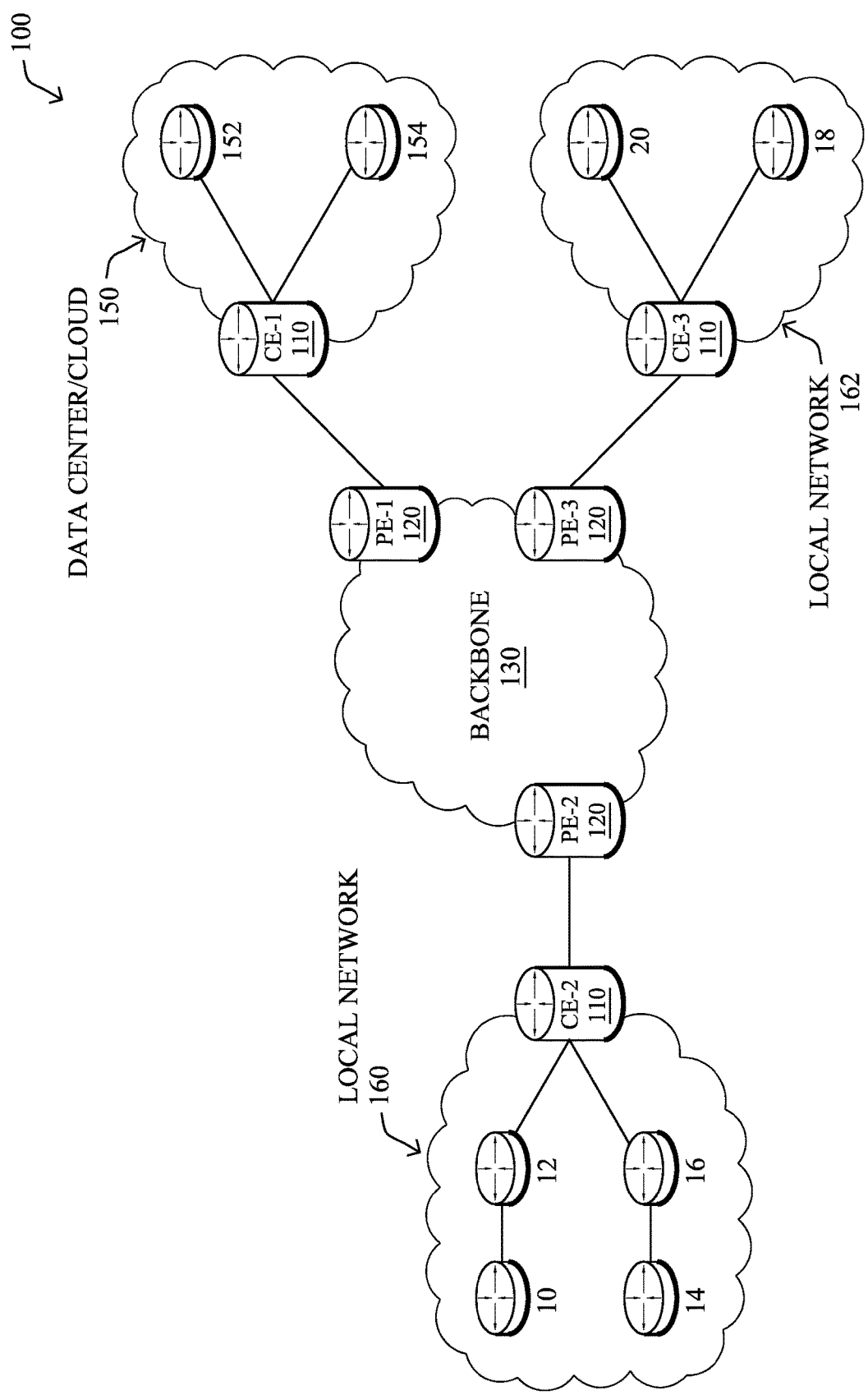

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10, 12, 14, 16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Figure 2:
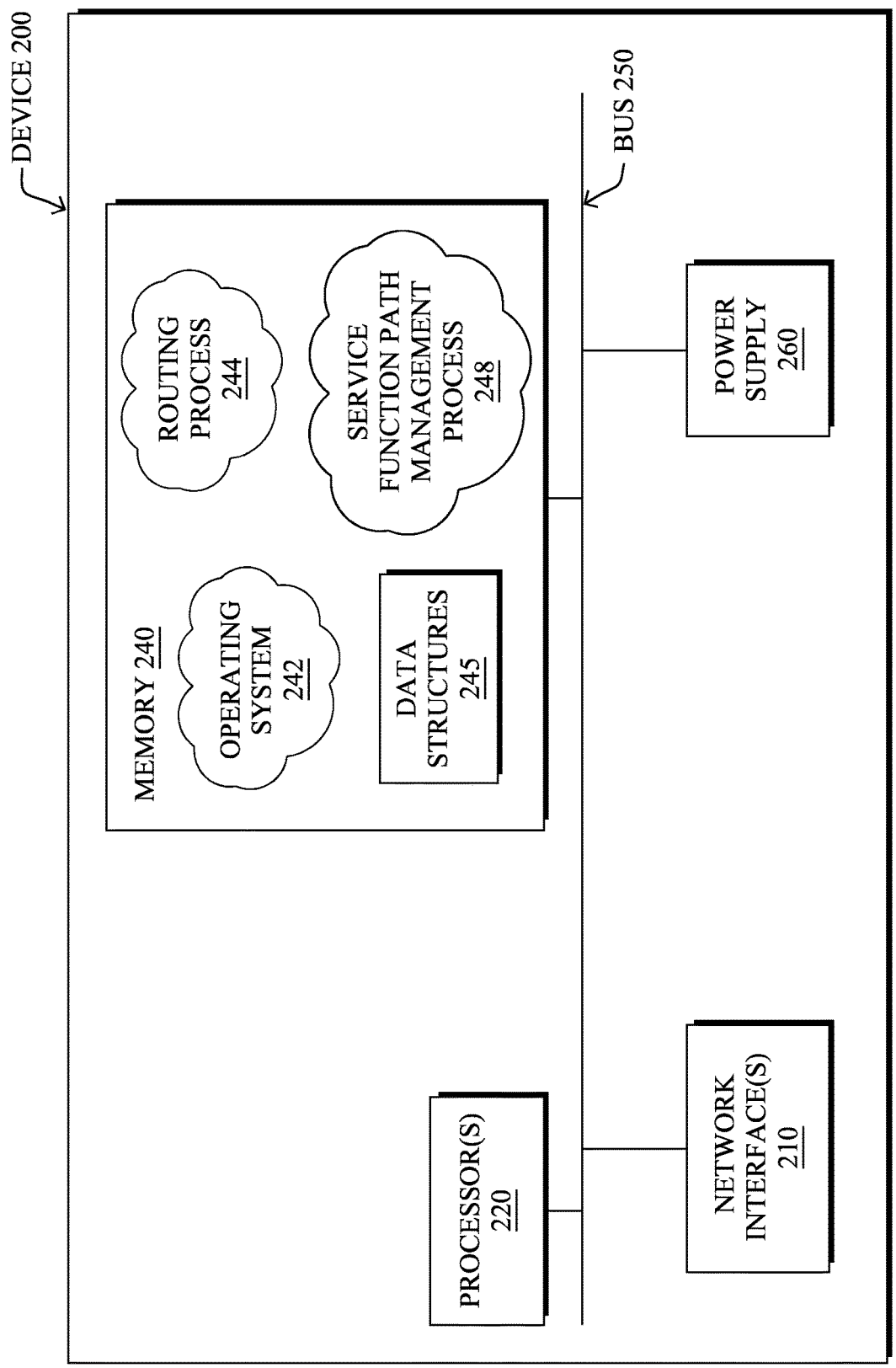
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the routers 120, routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The one or more network interfaces 210 include the mechanical, electrical, and signaling circuitry for communicating data over physical links coupled to the network 100. The network interfaces may be configured to transmit and/or receive data using a variety of different communication protocols. Notably, one or more network interfaces 210 may also be used to implement one or more virtual network interfaces, such as for virtual private network (VPN) access, known to those skilled in the art.

The memory 240 comprises a plurality of storage locations that are addressable by the one or more processors 220 and the one or more network interfaces 210 for storing software programs and data structures associated with the embodiments described herein. The one or more processors 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the one or more processors 220, functionally organizes the node by, inter alia, invoking network operations in support of software processors and/or services executing on the device.

These software processors and/or services may comprise a routing process 244 and/or a service function path management process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 contain computer executable instructions executed by one or more processors 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP) (e.g., in conjunction with service function path management process 248), etc., as will be understood by those skilled in the art. These functions may be configured to manage a forwarding information database containing, e.g., data used to make forwarding decisions. In particular, changes in the network topology may be communicated to or from device 200 using routing protocols, such as the conventional OSPF and IS-IS link-state protocols (e.g., to "converge" to an identical view of the network topology).

In various embodiments, routing process 244 may be configured to perform segment routing in the network, such as, e.g., in conjunction with an MPLS or IP-based network backbone. For example, routing process 244 may utilize extensions to the IGP (e.g., IS-IS, OSPF, etc.), that allow IGP messages to carry MPLS label information, to enable segment routing (MPLS-SR). In another example, routing process 244 may utilize a segment routing extension header (SRH) to carry segment routing information in a packet sent via an IP-based network, such as an IP version 6 (IPv6) network.

Generally, segments in a segment routed network may fall into one of two categories: node segments and adjacency segments. In particular, adjacency segments represent the local interface between a given device/node and an adjacent neighbor. Adjacency segments also do not need to be unique among the different nodes, as adjacency segments only require local significance to the particular node processing the packet. Node segments, in contrast, are global in nature and use globally-unique identifiers in the network to represent node segment endpoints.

Segments in segment routing are represented as segment identifiers (SIDs), which fall into two categories:
1.) Prefix SIDs—globally unique IDs that include an IP address prefix calculated by an IGP in the network. A sub-type of prefix SID is a node SID that represents a node segment and includes a loopback address of the node.
2.) Adjacency SIDs—SIDs that represents an adjacency link between an advertising router and a neighbor. Since this adjacency is of significance to a specific router, such as a specific interface to a neighboring router, it need only be locally unique and not globally unique within the network, as in the case of prefix SIDs.

In further embodiments, routing process 244 may be operable to implement the Service Function Chaining (SFC) architecture. Details regarding the SFC architecture can be found in the Internet Engineering Task Force (IETF) request for comments (RFC) entitled, "Service Function Chaining (SFC) Architecture" by J. Halpern, et al. In general, SFC facilitates the use of network services and provides for network location techniques to locate the device(s) that support these services. Example services may include, but are not limited to, caching services, firewall services, anti-intrusion services, malware detection services, deep packet inspection (DPI) services, acceleration services, load balancing services, lawful intercept (LI) services, optimization services, etc. In particular, a service function chain comprises an ordered set of services that may be provided to network traffic based on the classification of the traffic.

As part of the SFC architecture, a service function path (SFP) may be defined that indicates to which services a certain packet must be sent (e.g., which services are to perform their respective functions on the packet). The packet/frame may then be encapsulated, to include an indication of the SFP. Of note is that SFC encapsulation is used solely to include data plane context information and is not used for purposes of network packet forwarding. In particular, a network service header (NSH) may be added to a packet or frame, to convey metadata and service path information that may be used to create the service plane. For transport, the NSH and packet may be encapsulated in an outer header. Details regarding an NSH protocol header can be found in the IETF RFC draft entitled, "Network Service Header," by P. Quinn, et al.

Service function path management process 248 includes computer executable instructions that, when executed by one or more processors 220, cause device 200 to provide adaptive hierarchical service path selection in dynamic edge computing environments. In various embodiments, service function path management process 248 may utilize the services or processes provided by the routing process 244.

As noted above, distributed cloud networking, to provide a variety of applications, has increasingly required the use of multiple edge computing nodes to facilitate service function chaining, load balancing, and availability zoning. However, service placement (e.g., determining where certain applications may be located at edge computing nodes) and path selection (e.g., how a flow of traffic may be serviced by applications run by the edge computing nodes as it traverses a network) can be overwhelmingly complex due to numerous factors. These factors include a very large number of compute nodes as well as dynamic operation conditions, especially in mobile edge computing environments.

In particular, edge computing involves large numbers of geographically-distributed nodes (e.g., servers, mini-data centers, etc.) connected via a communications network. The deployment of edge computing has accelerated and increased the ability to bring application services closer to endpoint user device, while reducing backhaul network cost. However, edge computing devices oftentimes have limited hardware (or even network) resources, which leads to modern applications at the edge involving multiple nodes for service function chaining (SFC), load balancing, or improving service availability. Path selection at the edge is also bounded by latency and resource availability, which leads to difficulties for determining where path selection should be conducted (i.e., conventional cloud software-defined networking (SDN) controllers are typically located far away from the edge with non-negligible network delay and cost). On the other hand, edge nodes themselves have limited compute resources and lack operations support system/business support system (OSS/BSS) capabilities to address the path selection needs.

Adaptive Hierarchical Service Path Selection in Dynamic Edge Computing Environments The techniques herein address the above-described path selection complexity by providing an adaptive hierarchical scheme for dynamic edge computing networks that addresses latency and resource constraints. The adaptive hierarchical scheme manages service path selection(s), including service function chaining, across geographically distributed servers, mini data centers, etc. in dynamic edge compute environments, thereby allowing edge computing to be scaled at larger sizes than what is conventionally available. The adaptive hierarchical scheme also allows the application or service providers to minimize edge service deployment cost (e.g., server placement cost, network cost, etc.), while improving Quality of Experience (QoE) with bounded service latency and jitter.

That is, edge computing nodes (e.g., server capable nodes or mini-data centers) may be dynamically grouped based on proximity into path computation zones (zones), with each zone characterized by its boundary conditions, aggregated compute capacity, and application service and network load of the enclosed nodes. An upper-level service management function may determine zone-level service placement and path selections, where an optimization objective may be used to minimize cost, including both service placement cost and cross-zone network cost, while maintaining the latency bound on the target service function chains. To achieve this, service placement may be combined with the zone-level path selections via constrained programming and the use of zone boundaries to control macro-scale service placement jitter due to the node location ambiguity. It is to be understood that service management at this level may be implemented in the cloud or co-located with a service provider's BSS/OSS.

At the lower-level (real-time task) node service deployment and intra-zone path selection(s), a path computation element (PCE) may be configured in each zone to carry out this task. The PCE may be a software function implemented either on a service gateway, or on an edge node. The PCE monitors local resource and calculates local paths based on local service demand and the macro-scale path selection instructions from the upper layer (e.g., upper-level service management).

Specifically, according to one or more embodiments of the disclosure, a first path computation element receives a request from a gateway for service chain functions to be applied to a traffic flow, wherein a first subset of the service chain functions is located in a first zone. The first path computation element identifies a boundary node located at a border between the first zone and a second zone in which a second subset of the service chain functions are located. The first path computation element sends a response to the gateway indicating a path within the first zone between the gateway and the boundary node to apply the first subset of service chain functions to the traffic flow. The first path computation element provides, to a second path computation element, information regarding the traffic flow and the boundary node, wherein the second path computation element uses the information to configure the boundary node to route the traffic flow in the second zone to apply the second subset of service chain functions to the traffic flow.

Illustratively, the techniques described herein may be performed by hardware, software, and/or firmware, such as in accordance with the service function path management process 248, which may include computer executable instructions executed by the one or more processors 220 (or independent processor of one or more network interfaces 210) to perform functions relating to the techniques described herein, for example, in conjunction with routing process 244.

Figure 3:
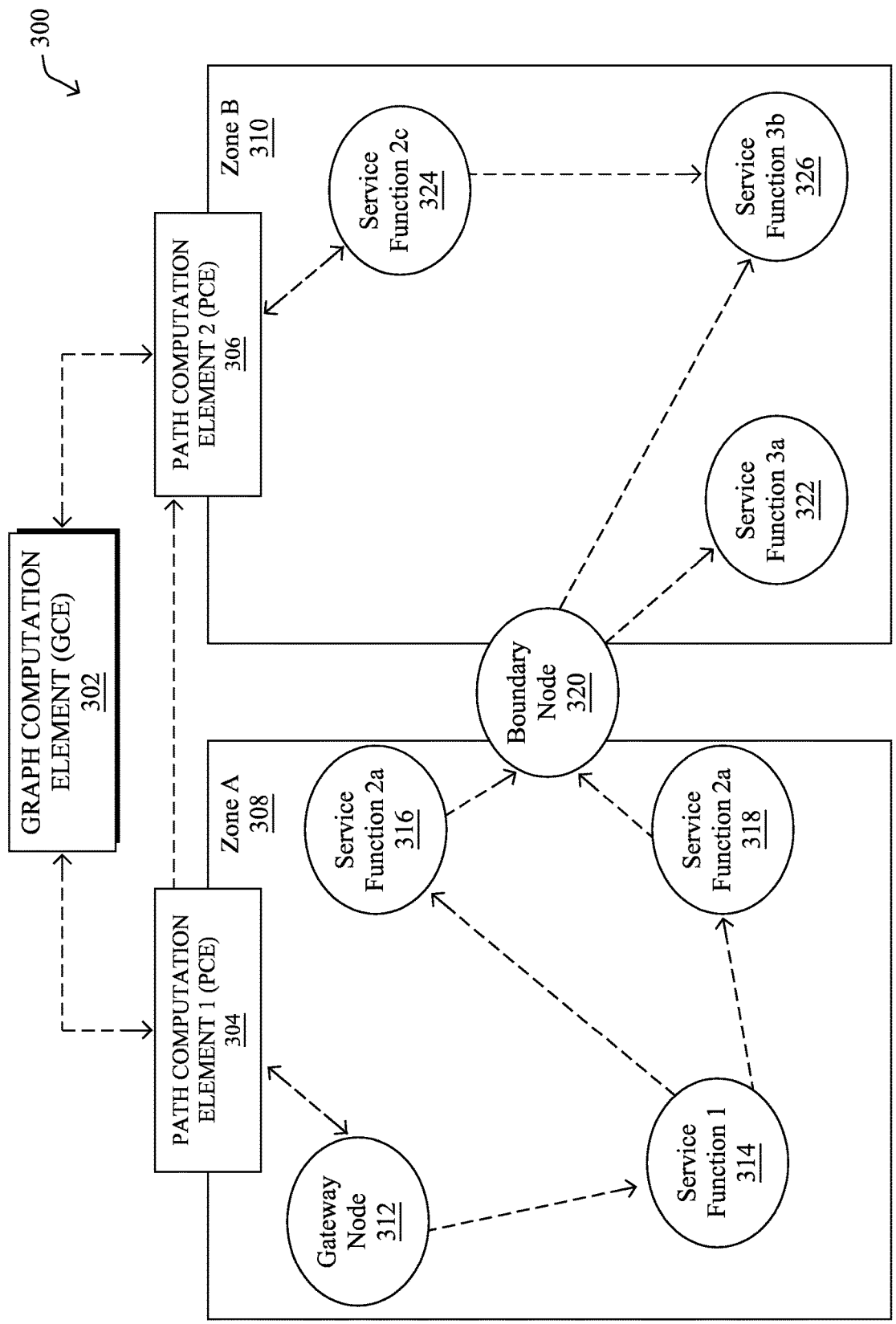
FIG. 3 illustrates an example dynamic edge computing environment.

Operationally, with reference to FIG. 3, an example dynamic edge computing environment 300 (e.g., computing network) is shown. The dynamic edge computing environment 300 includes a graph computation element (GCE) 302 and, at least, a first path computation element (PCE) 304 and a second PCE 306 that each are associated with a corresponding zone, Zone A 308 and Zone B 310. The GCE 302 (along with the PCE 304 and PCE 306) may be perform the service function path management process 248 described here to implement an adaptive hierarchical scheme that manages service path selection(s) across Zone A 308 and Zone B 310 managed by, respectively, the PCE 304 or PCE 306. In particular, application services may route and service, by a plurality of computing nodes, traffic flows in the dynamic edge computing environment. For example, within Zone A 308, a first PCE 304 may route a traffic flow between an endpoint in communication with a gateway node 312 (e.g., based an adaptive hierarchical scheme from the GCE 302) through service function node 314, service function node 316, and service function node 318 associated with Zone A 308 and up to a boundary node 320, where each of the service function node 314, service function node 316, and service function node 318 may perform one or more service functions that are chained on the traffic flow. The boundary node 320, at a dynamically selected intersection between Zone A 308 and Zone B 310, may bridge service functions provided by the service function node 314, service function node 316, and service function node 318 to the service function node 322, service function node 324, and service function node 326 within Zone B. Each of the nodes in dynamic edge computing environment 300 may be understood as an edge node with server capabilities, which can contain one or multiple of the following functions: service gateway, one or several service functions (SFs), or path computation element (PCE).

The dynamic edge computing environment 300 is conventionally situated between a "cloud" computing environment and endpoint user devices. As described above, each of service function node 314, service function node 316, service function node 318, service function node 322, service function node 324, or service function node 326 may comprise inter-connected distributed servers, mini data centers, etc. that are part of the dynamic edge computing environment 300 and provide one or more application services to endpoint user devices. Resources of each of the service function nodes is oftentimes limited, and running modern applications at the edge often involves multiple nodes for service function chaining (SFC), load balancing, or improving service availability.

The GCE 302 may be implemented to optimize path selection together with service placement to expand an optimization solution space across an entirety of the dynamic edge computing environment 300. In other words, by coordinating communications and instructions among the GCE 302 and the PCE 304 and/or PCE 306, an edge service management plane of the dynamic edge computing environment 300 may be decomposed (in a "macro" scale and a "micro" scale) to distribute application tasks, respectively, vertically between the cloud and the edge, and horizontally across different edge locations. That is, path computation may be simplified based on the principle of time-space decomposition. On the "macro" scale, path selections may be bounded by end-to-end service latency at minimum service deployment cost and backhaul network cost, while, on the "micro" scale, path selections may be bounded by the jitter of the macro-scale service placement (and lesson the complexity in achieving the fast-adapting path computations).

According to the "macro" scale and the "micro" scale, distributed path selections may be coordinated by the path computation elements (PCEs) of the dynamic edge computing environment 300, where the PCEs are understood as being part of a partial ordering. A "macro" scale PCE, for example the GCE 302, may coordinate multiple "micro" scale PCEs (e.g., PCE 304 and/or PCE 306), while each of "micro" scale PCE 304 and/or PCE 306 cover a fraction of nodes in path computation governed by the "macro" scale PCE (i.e., respective zones). Extrapolating across the "macro" and "micro" scales facilitates enforcement of global path selection optimizations and closed loop adaptations.

In FIG. 3, Zone A 308 and Zone B 310, as shown, comprise a plurality of computing nodes, and each zone may be understood as an autonomic path computation entity containing a set of nodes in proximity. As described above, each zone may have a PCE assigned to it, where the zone offers scaling limits for the PCE as well as bounded jitter for the macro-scale service placement. The boundary node 320 may be considered a cross-zone SF graph that connects the SFs from one or multiple zones for a business intent, for example, service function chaining, load balancing, service availability. This cross-zone SF graph may be centrally managed by the GCE 302 and may be used to distribute path computation across zones and connect the paths end-to-end.

With more detail regarding the GCE 302, on the "macro" scale, the GCE may be configured to implement:
(A) zone topology management that comprises determining zone topology (zone location and size) based on zone-level service load, latency, capacity distributions, etc.;
(B) cross-zone SF placement and SF graph construction that comprises, based on a current zone topology, assigning SFs to zone, constructing SF graphs (SFGs) across zones, and sending configurations to individual zones;
(C) zone telemetry collections that comprises polling PCE(s) for aggregated workload, data load, compute capacity, and intra-zone path latency measurements (used in the (A) zone topology management); and
(D) service demand and resource distribution analytics feed that comprises sending updated service demand/resource distribution information (used in the (A) zone topology management).

With more detail on the "micro" scale, the PCE 304 and/or PCE 306 may be configured to implement:
(A) node topology management that comprises interfacing with "macro" scale path management, discovering and monitoring server resources within a zone boundary (e.g., Zone A 308 or Zone B 310), and deploying SF functions, while monitoring performance metrics on selected paths; and
(B) node path calculations that comprises matching service requests to SFGs and selecting paths within the zone boundary and requesting path from the downstream zones based on a respective SFG (then sending the selected path to (A) node topology management).

Cross-zone path selections may be done in parallel or in a pipelined manner. The upper layer decomposes a "macro" scale service function graph (SFG) and requests ask each zone to resolve a sub-graph of the SFG. Paths from adjacent zones can then be connected at the boundary nodes using the common SFG ID. For cases where the boundary nodes are pre-determined, adjacent zones can select paths simultaneously. For cases where boundary nodes are unknown prior to the sub-graph resolution, paths can be selected in a pipelined manner with the upstream zone passing the boundary node identifier to the downstream zone along with the SFG ID.

To facilitate cross-zone path selections and as will be described in greater detail herein below, segment routing (e.g., with a YANG based management interface) may be implemented to convey hierarchical path selection instructions and to stitch the paths across adjacent zones.

Figure 4A:
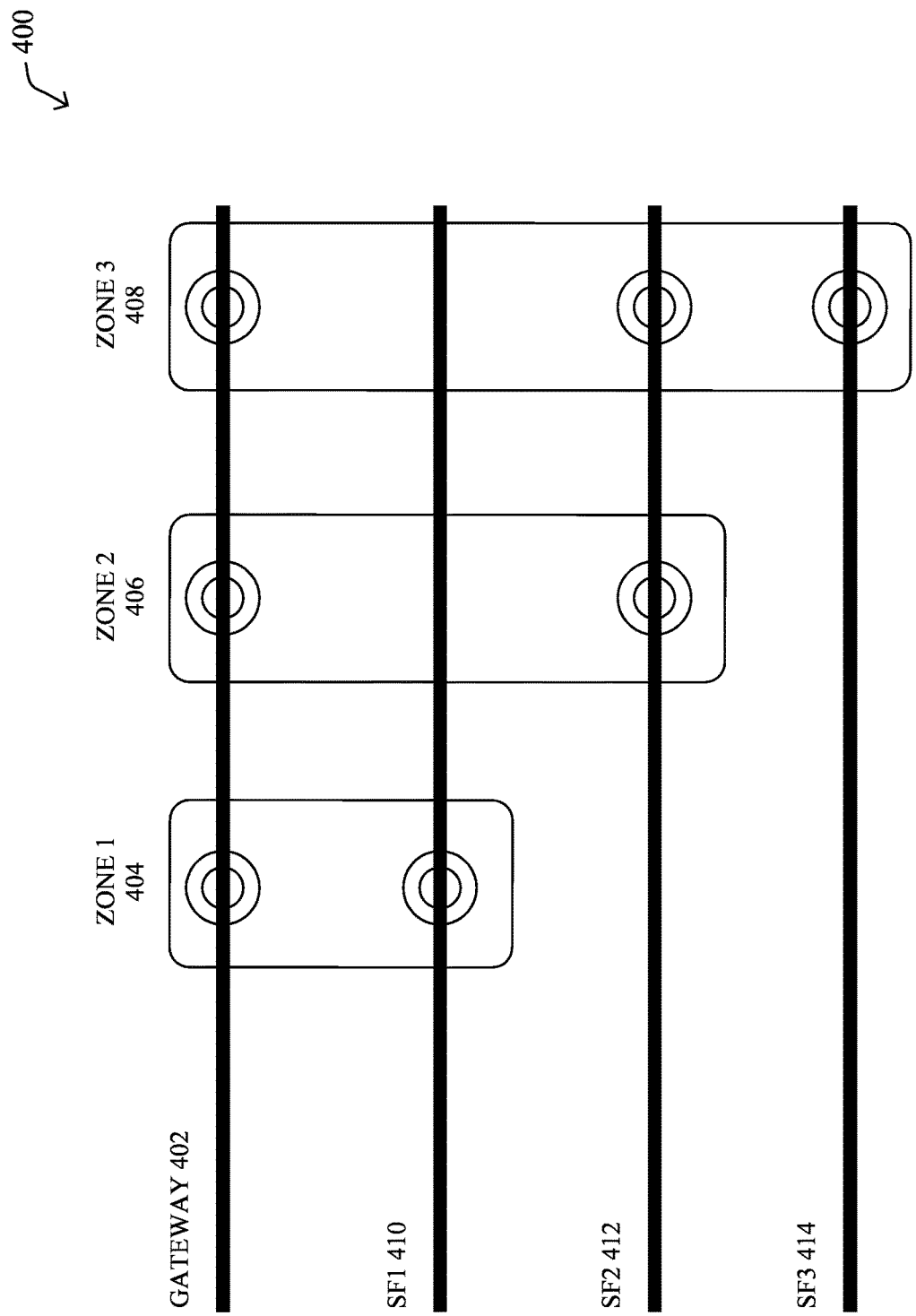
FIGS. 4A-4C illustrate an example service-zone grid for an adaptive hierarchical path selection scheme in a dynamic edge computing network.
Figure 4B:
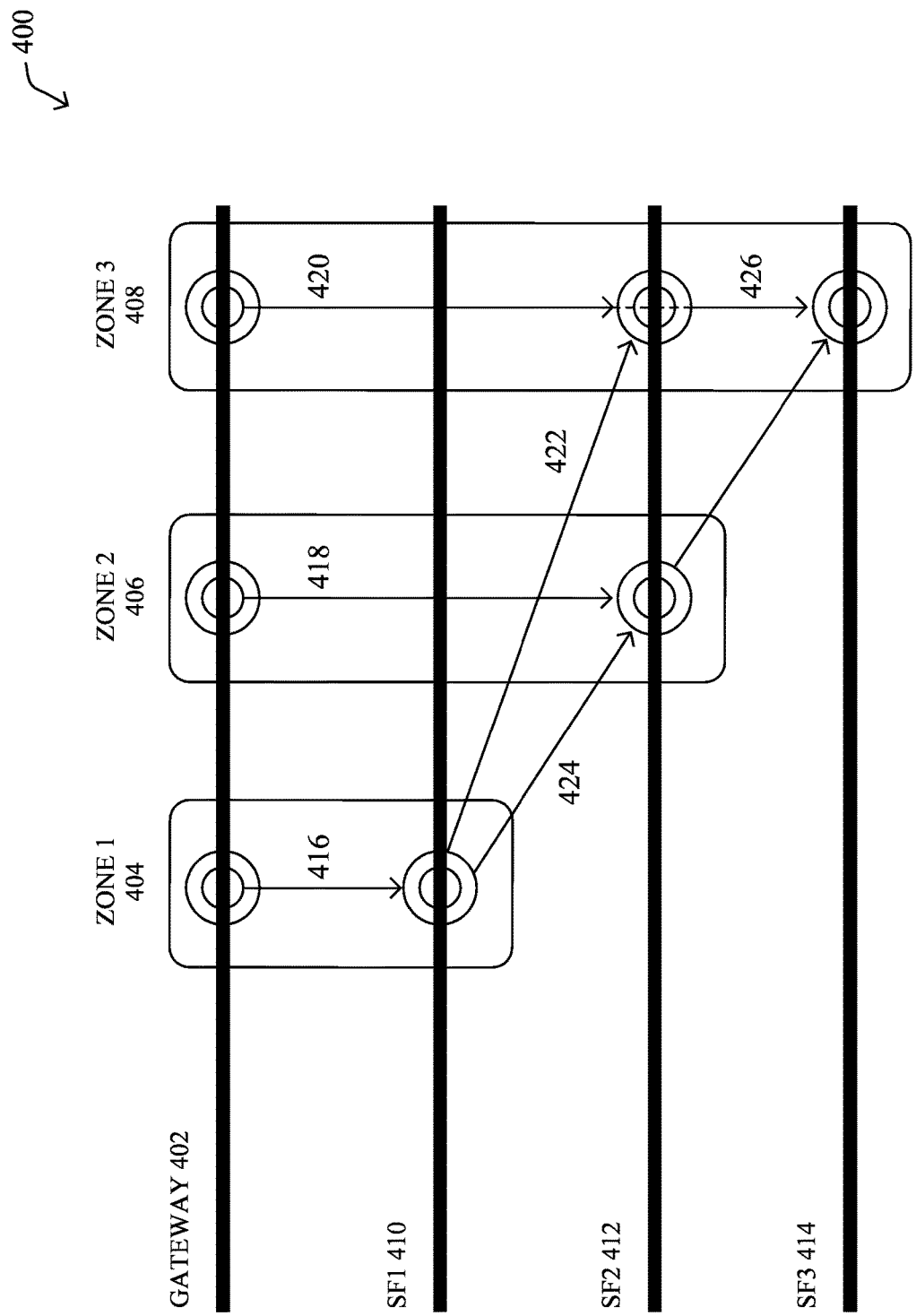
Figure 4C:
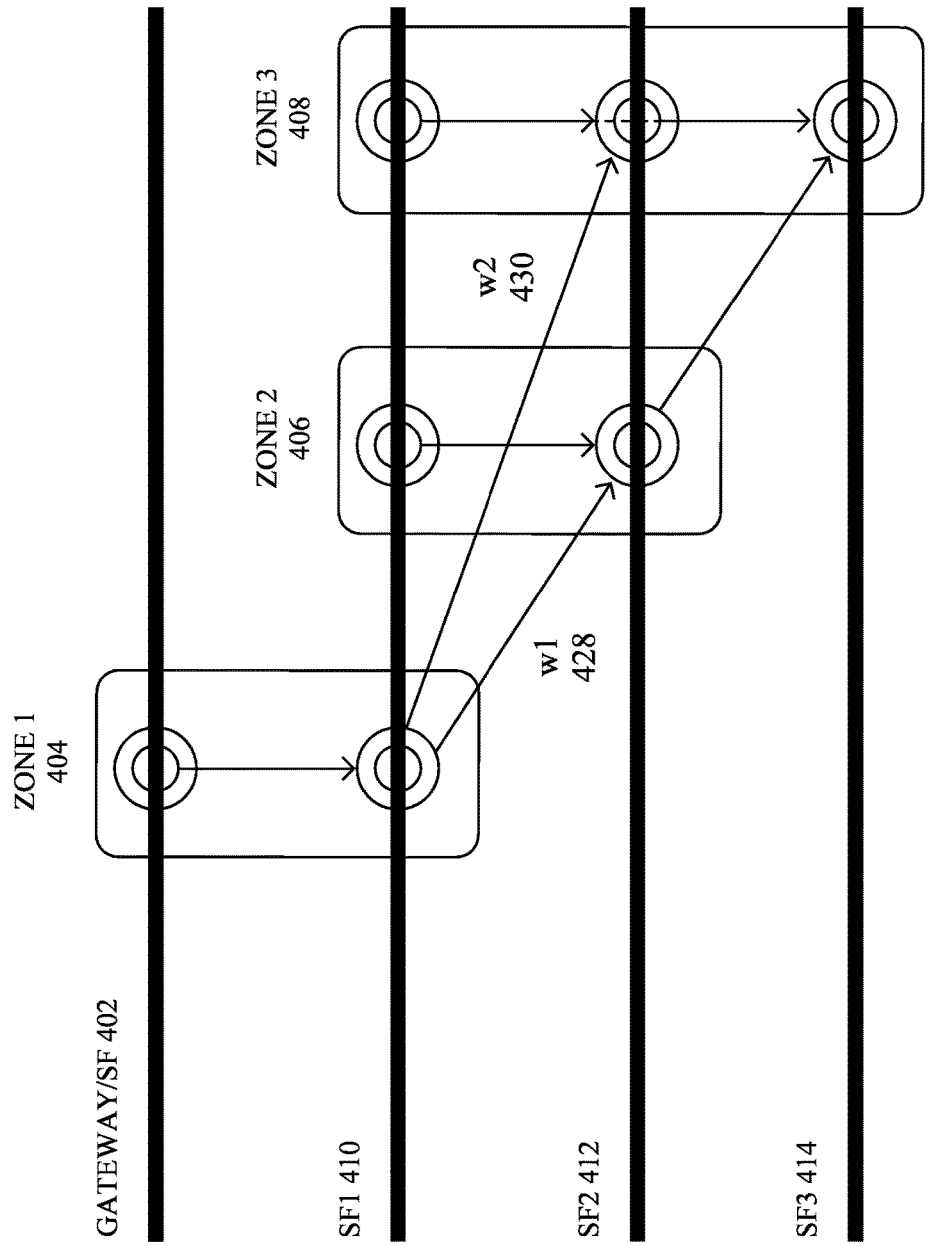

Turning now to FIGS. 4A-4C, an example service-zone grid 400 for an adaptive hierarchical scheme in a dynamic edge computing networks is shown. In FIG. 4A, a gateway device 402 in a service-zone grid 400 is formed after assigning SFs to zones, under the following constraints: (a) a zone can contain multiple SF instances; (b) an SF instance can be placed in a single zone or multiple zones; (c) path preference is given to the SF instances in the same zone as the gateway; and (d) within a zone, the network latency between SF instances is negligible, without (or with very limited) backhaul transport cost. This results in a gateway device 402 being associated with a Zone 1 404, Zone 2 406, and Zone 3 408. Zone 1 404 may include only the gateway device 402 and a service function node 410, while Zone 2 406 may include the gateway device 402 and service function node 412 (e.g., that each have a local instance of a service function). Zone 3 408 may include the gateway device 402, the service function node 412, and a service function node 414 (e.g., that has a local instance of a service function).

FIG. 4B demonstrates how a SF graph (SFG) connects SF instances in the service-zone grid 400. A vertex (e.g., the gateway device 402 to service function node 410, service function node 412, or service function node 414) may represent a placement of a SF instance. Further, directional links 416-426 may represent the cost to access the SF instance pointed by the link, including SF placement cost as well as backhaul network cost if the link across different zones. For SFGs that includes multiple paths to the same service SFs, a weight may be assigned to each path for weighted load balancing.

Construction of a service function graph of the SFGs may involve assigning SF instances to zones and connecting the SFs (intra-zone or inter-zone), shown in FIGS. 4A-4B, to minimize cost for a specific SFC sequence under the latency and scaling constraints. In particular, assuming an edge is partitioned into N zones, and using total of L backhaul connections, the optimization objective can be expressed as $$\text{Min}(\Sigma_{i=1}^{N}\Sigma_{j=1}^{M_i} x_{ij} CP_{ij} + \Sigma_{i=1}^{N}\Sigma_{k=1}^{N} y_{ik} CN_{ik}),$$

subject to:
1) $\Sigma_{i=1}^{N}\Sigma_{j=1}^{M_i} x_{ij} = M$, (all SFs in the SFC are placed)
$x_{ij} \in \{0,1\}$ for $i \in \{1, N\}$, $j \in \{1, M_i\}$ ($SF_j$ in $zone_i$ is placed or not),
and
2) $\Sigma_{i=1}^{N}\Sigma_{k=1}^{N} y_{ij} \leq N-1$, (all zones are used for the SFC placement) and
and $y_{ik} \in \{0,1\}$ for $i \in \{1, N\}$, $j \in \{1, N\}$ (connection between $zone_i$ and $zone_k$ is selected or not).

3) $\Sigma_{i=1}^{N}\Sigma_{k=1}^{N} y_{ij}L_{ik} \leq L$, (total latency constraint)

Where,

N The maximum number of zones $M_i$ The maximum number of SFs that can be placed in zone$_i$ M The total number of SFs in the SF chain.

$CP_{ij}$ The compute cost for placing a $SF_j$ instance in zone$_i$ $CN_{ik}$ The network cost for the connection between zone$_i$ and zone$_k$ Resultingly, placement of a service function and a construction algorithm for an SFG may comprise:

1. Assuming the SFG for the SFC sequence ($SF_1, \ldots SF_j, \ldots SF_M$) originating from zone$_i$ has workload ($w_1, \ldots w_j, \ldots w_M$) and data load ($d_1, \ldots d_j, \ldots, d_M$). For each SF in the SFC sequence, temporarily add the required workload to each zone, and modify the SF placement cost based on the assumption that for Zone$_i$, the existing $SF_j$ workload is $W_{ij}$, and that the number of the additional $SF_j$ instances needed to support $w_j$ is:

$$n_{ij} = \begin{cases} 0, & \text{if } ((W_{ij} > 0) \text{ and } (W_{ij} \bmod(Cap_{ij}) + w_j) < Cap_{ij}) \text{//Fit in existing capacity} \\ \text{roundup}\left(\text{Int}\left(\frac{(W_{ij} \bmod (Cap_j)) + w_j}{Cap_{ij}}\right)\right), & \text{else//Exiting capacity exceeded, new SF instances needed} \end{cases}$$

where $Cap_{ij}$ is the capacity of a single SF instance in handling $SF_j$ in Zone$_i$;

2. Check the scaling constraint, assuming Zone$_i$ is already handling $m_i$ SFs:

if $(m_i+n_{ij}>M_i)$, then scaling limit is exceeded, prune the temporarily added $SF_j$ instances from Zone$_i$;

else, update the $SF_j$ placement cost in Zone$_i$;

3. Check the latency constraint for all candidate SFGs and prune the ones that exceeds the latency limit;

4. Update the network cost in the remaining candidate SFGs to support the added data load ($d_1, \ldots d_j, \ldots d_M$);

5. Use a depth-first-search (or some other algorithms) to select the graph that gives the minimum cost that combines both the service placement cost and the network cost;

6. Clean up the graph by removing the temporarily added SF instances with the associated workload and data load, if they are not used by the selected graph.

Turning to FIG. 4C, application of SFG configuration encoding to resulting assignment of SF instances to zones and connections SFs (intra-zone or inter-zone) is shown. In particular, an SFG may be uniquely identified by an SFG identifier (ID) and may contain multiple zone-specific sub-graphs. Each sub-graph contains a list of local SF IDs and a list of the immediate downstream zone IDs. For example, as shown, a Zone 1 sub-graph contains instances of local SFs at gateway device 402 and service function node 410 and downstream Zone 1 406 and Zone 2 408. A Zone 2 sub-graph contains instances of local SFs at service function node 410, service function node 412, and downstream Zone 3 408. A Zone 3 sub-graph contains instances of local SFs at service function node 410, service function node 412, and service function node 414 and has no downstream zone. As shown and described above, when there are multiple downstream zones, weightings 428, 430 may be assigned for weighted load balancing.

With more detail regarding elastic zone boundaries (between zones), a zone boundary may define maximum jitter tolerance due to server location ambiguity when placing services to zones at the "macro" scale referenced above. The zone boundary may also cast a scaling limit, in terms of a number of nodes that participate in path finding in each zone, to lessen the implementation complexity at a PCE. In particular, assuming zone$_i$ includes $n_i$ SF instances, $L_{kj}$ is the network latency between $SF_k$ and $SF_j$ in zone$_i$, the boundary for zone$_i$ may be defined as the set of the SF nodes that satisfies the following conditions:

1. $L_{ki} \leq L_{max}$, for any ($SF_k$, $SF_j$) node pair in zone$_i$; and
2. $n_i < N_i$ where $L_{max}$ represents a maximum network latency between any two SF instances within a zone and $N_i$ represents a maximum number of SF instances that zone$_i$ can have.

Once zone boundaries have been determined, nodes in each zone form a densely connected mesh network. To perform node topology management with a zone, a corresponding (managing) PCE (e.g., PCE 304 and/or PCE 306 of FIG. 3) may conduct periodic latency measurements of the mesh and manage zone membership based on the zone latency boundary and the scaling limit. Nodes that exceed a latency bound may be excluded from a zone by the PCE.

Further, if a number of nodes that meet the latency requirements exceeds a scaling limit, the PCE may select the nodes with the highest capacities. As described in more detail, the PCE may deploy SFs on the edge nodes based on the SF configuration from the "macro" scale service path management. The PCE may be configured to report back to the "macro" scale service path management the compute capacity, average service load, and data load for each SF type.

For service function graphs that comprise multiple zones (e.g., across Zone 1 and Zone 2 in FIGS. 4A-4C), node paths may be calculated in a distributed manner. Each PCE in a respective zone in the SFG resolves the sub-SFG with its zone boundary. Further, the paths computed by adjacent zones are connected at the boundary nodes via a common SFG ID. If the boundary nodes are pre-determined, sub-SFGs can be resolved in parallel along the SFG. If the boundary nodes are unknown, the sub-SFGs can be resolved sequentially by passing the boundary node location with the SFG ID to the downstream zones.

Figure 5A:
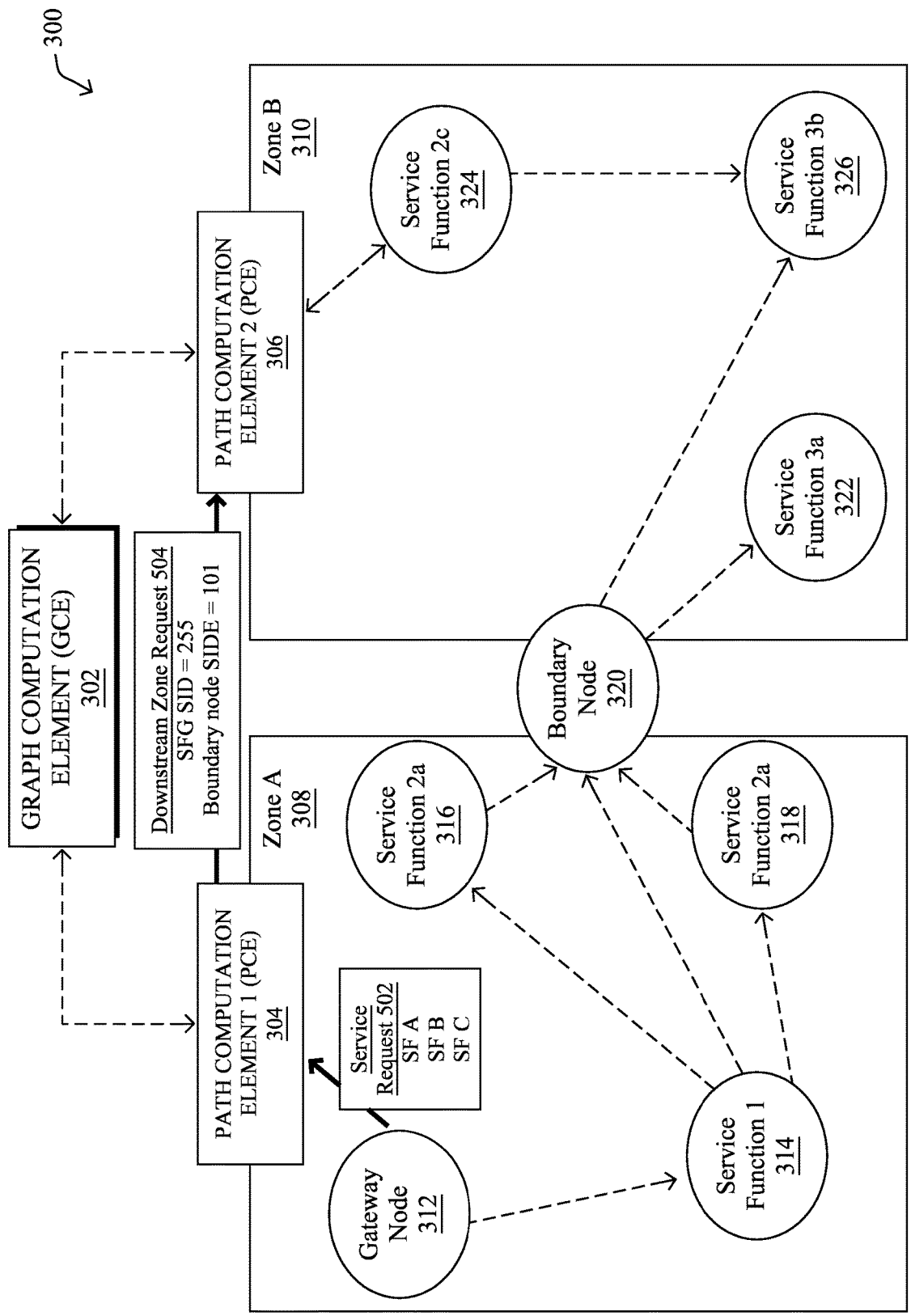
FIGS. 5A-5C illustrate an example implementation of segment routing (SR) to steer traffic in a dynamic edge computing environment according to an adaptive hierarchical path selection scheme.
Figure 5B:
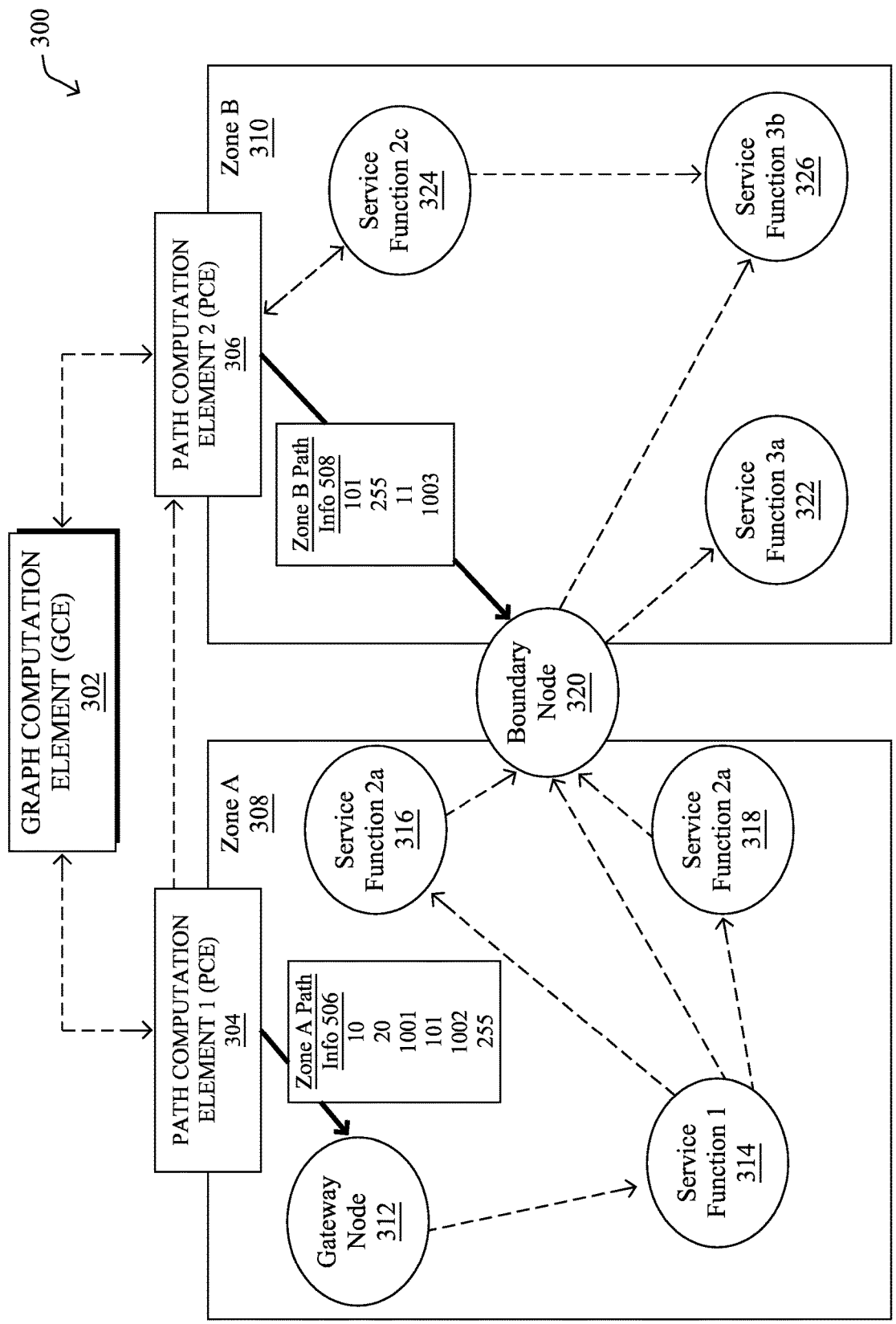
Figure 5C:
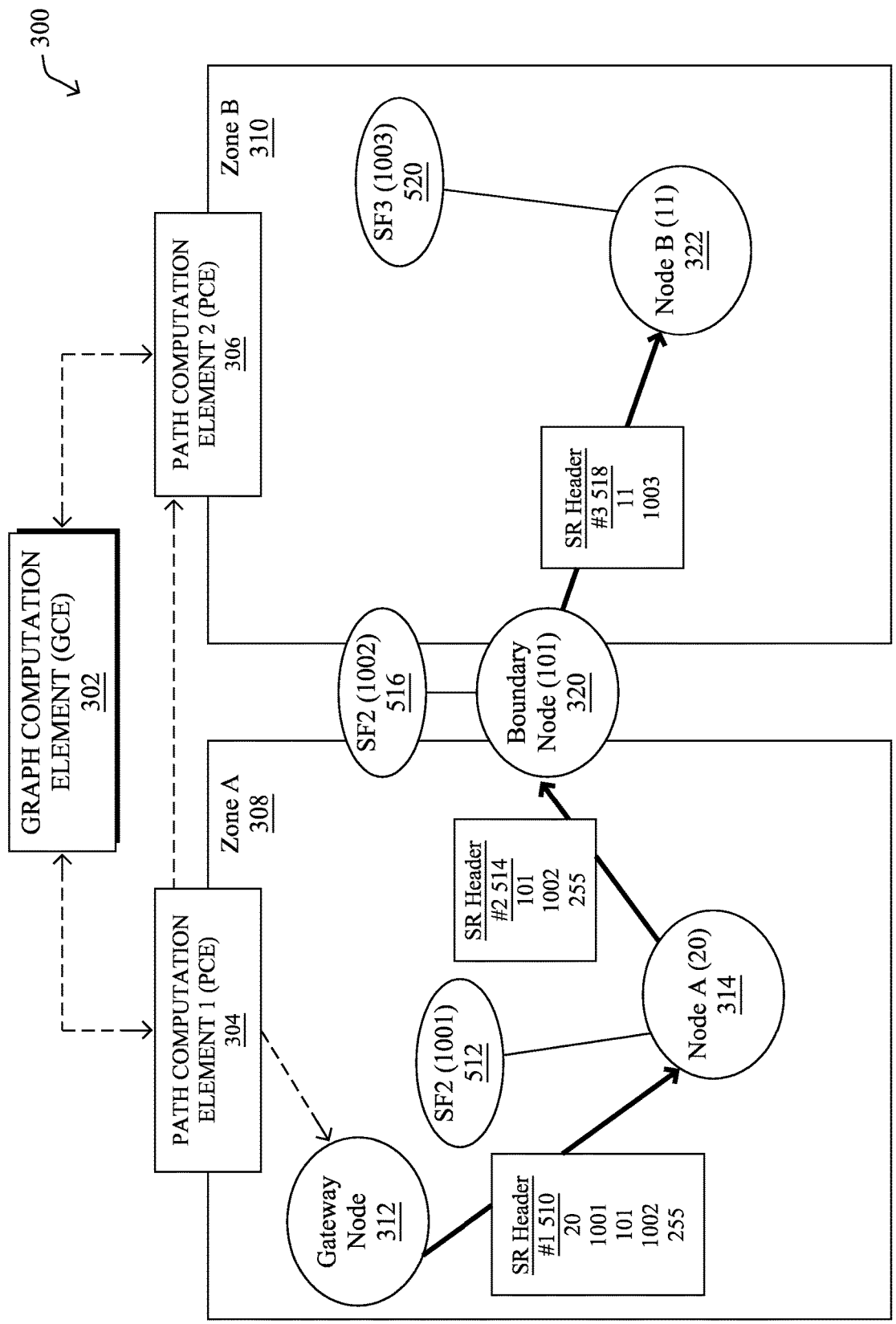

Turning to FIGS. 5A-5C an example implementation of segment routing (SR) to steer traffic in dynamic edge computing environment 300 according to an adaptive hierarchical path selection scheme. Notably, SR can be implemented for its simplicity, scalability, and the ability to steer traffic across multiple domains using a binding SID (BSID). Additional segment types may be introduced or implemented with a SR-based protocol to steer traffic across Zone A 308 and Zone B 310, including:

(A) a zone segment that indicates a global segment uniquely identifies a zone, assigned by the GCE 302 (at the "macro" scale);

(B) a service function (SF) segment that uniquely identifies a SF, assigned by the GCE;

(C) a service function (SF) instance segment that locally identifies an SF instance placed on a node within a zone;

(D) a gateway or boundary node segment that uniquely identifies a start or an end node of the intra-zone service path; and (E) a segment function (SF) graph segment that uniquely identifies an SFG and is used at the boundary node to stitch together the intra-zone service paths between adjacent zones.

In the example shown in FIG. 5A, assume that an SFG with an SID of 255 contains two sub-SFGs, a Zone A subgraph with an SF list of SF1 (e.g., service function node 314) and SF2 (e.g., service function node 316 or service function node 318) and a Zone B subgraph with an SF list of only SF3 (e.g., service function node 322 or service function node 326). Additionally, it can be assumed that the boundary node 320 has not been pre-determined. Segment routing for a traffic flow (where the traffic flow is to receive service(s) from: service function node 314 and service function node 316 or service function node 318) may begin when the gateway node 312 sends a service request 502 for an ordered list of services, for example, SF1, SF2 and SF3 (provided through Zone A and Zone B) from the first PCE 304. After receiving the service request 502, the first PCE 304 matches the service request 502 that is received with an SFG with a SID of 255 and calculates a local path for the service request 502 to traverse within Zone A 308. The first PCE 304 may also send a downstream zone request 504 to the second PCE (that includes Zone B 310) with the SFG with the SID of 255 and a boundary node identifier (e.g., a boundary node segment=SID of 101) (e.g., using a gateway or boundary node segment indicating the start of a service path within Zone B 310).

As shown in FIG. 5B, the first PCE 304 of Zone A may then send to the gateway node 312 the Zone A path information 506 leading to the boundary node 320 that the traffic flow should traverse. The Zone A path information 506 may include identifiers of the devices (e.g. SIDs) the traffic flow should traverse in Zone A, including:

1. the gateway 315 (e.g., a gateway ID=10);
2. the service function node 314 (e.g., SF segment ID=20);
3. a service function offered by the service function node (e.g., SF instance ID=1001);
4. the boundary node 320 (e.g., a boundary node segment=SID of 101);
5. a service function offered by the boundary node 320 (e.g., a SF instance segment ID=1002); and
6. the SFG with the SID of 255.

In the meantime, the second PCE 306 of Zone B may send Zone B path information 508 to the boundary node 320 using same SFG SID (255), where the Zone B path information 508 may include identifiers of the devices (e.g. SIDs) the traffic flow should traverse in Zone B, including:

1. the boundary node 320 (e.g., a boundary node segment=SID of 101);
2. the SFG with the SID of 255;
3. service function node 322 (e.g., SF segment ID=11); and
4. a service function offered by the service function node (e.g., SF instance ID=1003).

As shown in FIG. 5C, the traffic flow, in Zone A 308, may then use segment routing headers generated based on the Zone A path information 506 to traverse Zone A 308. In particular, from the gateway node 312 to the service function node 314 may use a first segment routing header 510 that may include identifiers of the devices (e.g. SIDs) the traffic flow should traverse in Zone B starting from the boundary node 320, including: the service function node 314 (e.g., SF segment ID=20); a service function offered by the service function node 314 (e.g., SF instance ID=1001); the boundary node 320 (e.g., a boundary node segment=SID of 101); a service function offered by the boundary node 320 (e.g., a SF instance segment ID=1002); and the SFG with the SID of 255. When the traffic flow traverses the service function node 314, a service function 512 offered by the first service function instance may be applied to the traffic.

Then, at the service function node 314, it may continue the traffic flow onto the boundary node 320 using a second segment routing header 514 that may include identifiers of the path (e.g. SIDs) the traffic flow should traverse, including: the boundary node 320 (e.g., a boundary node segment=SID of 101); a service function offered by the boundary node 320 (e.g., a SF instance segment ID=1002); and the SFG with the SID of 255. When the traffic flow traverses the boundary node 320, a service function 516 offered by a service function instance at the boundary node 320 may be applied to the traffic.

At the boundary node 320, the boundary node 320 may replace the segment routing information (e.g., the SFG SID of 255) with the information from the Zone B path information 508 that indicates a path the traffic is to traverse in Zone B. In particular, the boundary node 320 may use a third segment routing header 518 that may include identifiers of the devices (e.g. SIDs) the traffic flow should traverse, including: the service function node 322 (e.g., SF segment ID=11) and the service function offered by the service function node (e.g., SF instance ID=1003). When the service function node 322 receives the traffic, a service function 520 offered by a service function instance at the service function node 322 may be applied to the traffic.

Figure 6:
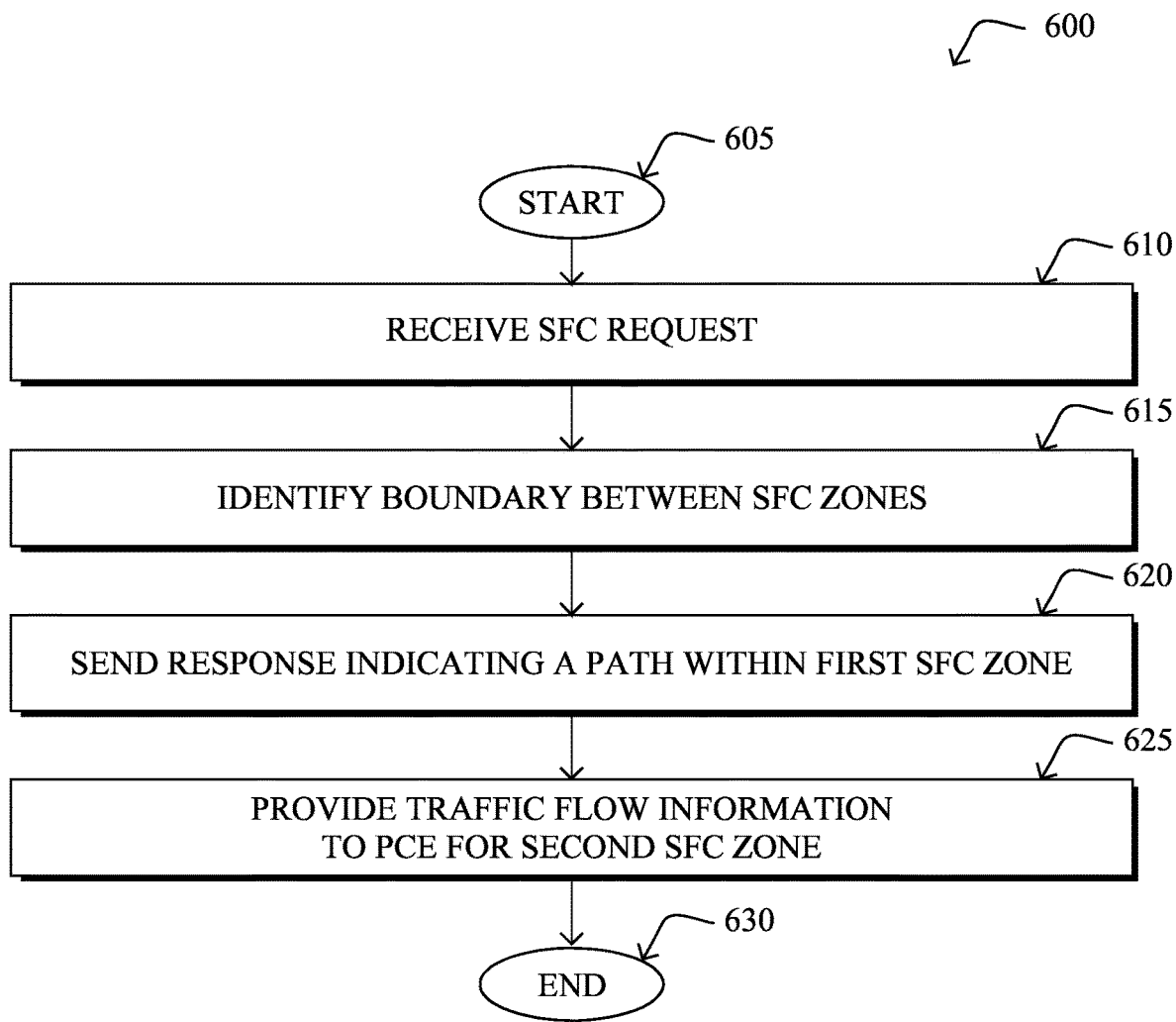
FIG. 6 illustrates an example procedure for an adaptive hierarchical path selection scheme in a dynamic edge computing network.

FIG. 6 illustrates an example simplified procedure (e.g., a method) for adaptive hierarchical service path selection in dynamic edge computing environments in accordance with one or more embodiments described herein. For example, a non-generic, specifically configured device (e.g., device 200) may perform procedure 600 by executing stored instructions (e.g., service function path management process 248). The procedure 600 may start at step 605, and continues to step 610, where, as described in greater detail above, a device may receive a service function chain request, where the request is for one or more service functions to be applied to a traffic flow in a network. In particular, a first path computation element (PCE) may receive a request from a gateway for a list of service function chaining (SFC) service functions to be applied to a traffic flow, wherein a first subset of the service chain functions is located in a first zone. The request from the gateway includes may include list of service chain functions provided in the first zone or the second zone. A GCE may determines boundaries of the first zone and the second zone At step 615, the device may identify a boundary between SFC zones, for example, a boundary node between two SFC zones in the network. In particular, the first PCE may identify a boundary node located at a border between the first zone and a second zone in which a second subset of the service chain functions are located. The first PCE may match the request from the gateway with a segment function graph identifier.

At step 620, the device may send a response indicating a path within a first SFC zone, where the first SFC zone is one of the two zones. In particular, the first PCE may send a response to the gateway indicating a path within the first zone between the gateway and the boundary node to apply the first subset of service chain functions to the traffic flow. The response to the gateway indicating the path within the first zone between the gateway and the boundary node may include the segment function graph identifier.

At step 625, the device may provide, to a second PCE, information regarding a second SFC zone (e.g., how the traffic flow is to be traversed or serviced in the second zone). In particular, the first PCE may provide, to the second PCE, information regarding the traffic flow and the boundary node, wherein the second PCE uses the information to configure the boundary node to route the traffic flow in the second zone to apply the second subset of service chain functions to the traffic flow. The information regarding the traffic flow and the boundary node may comprise the segment function graph identifier and a boundary node identifier. The second PCE may configure the boundary node to route the traffic flow in the second zone to apply the second subset of service chain functions to the traffic flow by sending the segment function graph identifier and the boundary node identifier to the boundary node. The first PCE and the second PCE may comprise a server capable node or a data center. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 600 are described separately, certain steps from each procedure may be incorporated into each other procedure, and the procedures are not meant to be mutually exclusive.

The techniques described herein, therefore, enable adaptive hierarchical service path selection in dynamic edge computing environments. In particular, edge computing nodes (e.g., server capable nodes, mini-data centers, etc.) may be grouped based on proximity into path computation zones (zones), with each zone characterized by its boundary conditions, and the aggregated compute capacity, service and network load of the enclosed nodes. "Macro" scale service (e.g., by a GCE) adaptation may be enabled by adjusting zone boundaries, service placement, and SFGs using long-term, steady-state statistics. Further, "micro" scale, fast-adapting path selections may be made (e.g., by a PCE) based on real-time traffic demand, resource, and latency measurements.

While there have been shown and described illustrative embodiments that provide for dynamically tracking/modeling systems according to risk level, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a first path computation element of a first zone, a request from a gateway for service chain functions to be applied to a traffic flow, wherein a first subset of the service chain functions is located in the first zone;
   identifying, at the first path computation element, a boundary node located at a border between the first zone and a second zone in which a second subset of the service chain functions are located by matching the request from the gateway with a segment function graph identifier;
   sending, at the first path computation element, a response to the gateway indicating a path within the first zone between the gateway and the boundary node to apply the first subset of service chain functions to the traffic flow; and
   providing, by the first path computation element and to a second path computation element of the second zone, information regarding the traffic flow and the boundary node, the information comprising a boundary node identifier to identify the boundary node, wherein the second path computation element uses the information to configure the boundary node to route the traffic flow in the second zone to apply the second subset of service chain functions to the traffic flow.

2. The method as in claim 1, wherein the request from the gateway includes a list of service chain functions provided in the first zone or the second zone.

3. The method as in claim 1, wherein the response to the gateway indicating the path within the first zone between the gateway and the boundary node includes the segment function graph identifier.

4. The method as in claim 1, wherein the information regarding the traffic flow and the boundary node further comprises a segment function graph identifier, and wherein the boundary node is unknown to the second path computation element prior to the first path computation element providing the boundary node identifier to the second path computation element.

5. The method as in claim 4, wherein the second path computation element configures the boundary node to route the traffic flow in the second zone to apply the second subset of service chain functions to the traffic flow by sending the segment function graph identifier and the boundary node identifier to the boundary node.

6. The method as in claim 1, wherein a graph computation element determines boundaries of the first zone and the second zone.

7. The method as in claim 1, wherein the first path computation element and the second path computation element comprise a server capable node or a data center.

8. An apparatus, comprising:
   one or more network interfaces to communicate with a network;
   a processor coupled to the one or more network interfaces and configured to execute one or more processes; and
   a memory configured to store a process that is executable by the processor, the process when executed configured to:
   receive, at a first path computation element of a first zone, a request from a gateway for service chain functions to be applied to a traffic flow, wherein a first subset of the service chain functions is located in the first zone;

identify a boundary node located at a border between the first zone and a second zone in which a second subset of the service chain functions are located by matching the request from the gateway with a segment function graph identifier;

send a response to the gateway indicating a path within the first zone between the gateway and the boundary node to apply the first subset of service chain functions to the traffic flow; and provide, to a second path computation element of the second zone, information regarding the traffic flow and the boundary node, the information comprising a boundary node identifier to identify the boundary node, wherein the second path computation element uses the information to configure the boundary node to route the traffic flow in the second zone to apply the second subset of service chain functions to the traffic flow.

9. The apparatus as in claim 8, wherein the request from the gateway includes a list of service chain functions provided in the first zone or the second zone.

10. The apparatus as in claim 8, wherein the response to the gateway indicating the path within the first zone between the gateway and the boundary node includes the segment function graph identifier.

11. The apparatus as in claim 8, wherein the information regarding the traffic flow and the boundary node further comprises a segment function graph identifier, and wherein the boundary node is unknown to the second path computation element prior to the first path computation element providing the boundary node identifier to the second path computation element.

12. The apparatus as in claim 11, wherein the second path computation element configures the boundary node to route the traffic flow in the second zone to apply the second subset of service chain functions to the traffic flow by sending the segment function graph identifier and the boundary node identifier to the boundary node.

13. The apparatus as in claim 8, wherein a graph computation element determines boundaries of the first zone and the second zone.

14. The apparatus as in claim 8, wherein the first path computation element and the second path computation element comprise a server capable node or a data center.

15. A tangible, non-transitory, computer-readable medium storing program instructions that cause a first path computation element to execute a process comprising:

receiving, at the first path computation element of a first zone, a request from a gateway for service chain functions to be applied to a traffic flow, wherein a first subset of the service chain functions is located in the first zone;

identifying, at the first path computation element, a boundary node located at a border between the first zone and a second zone in which a second subset of the service chain functions are located by matching the request from the gateway with a segment function graph identifier;

sending, at the first path computation element, a response to the gateway indicating a path within the first zone between the gateway and the boundary node to apply the first subset of service chain functions to the traffic flow; and providing, by the first path computation element and to a second path computation element of the second zone, information regarding the traffic flow and the boundary node, the information comprising a boundary node identifier to identify the boundary node, wherein the second path computation element uses the information to configure the boundary node to route the traffic flow in the second zone to apply the second subset of service chain functions to the traffic flow.

16. The tangible, non-transitory, computer-readable medium storing program instructions as in claim 15, wherein the information regarding the traffic flow and the boundary node comprises a segment function graph identifier and a boundary node identifier.

17. The tangible, non-transitory, computer-readable medium storing program instructions as in claim 16, wherein the second path computation element configures the boundary node to route the traffic flow in the second zone to apply the second subset of service chain functions to the traffic flow by sending the segment function graph identifier and the boundary node identifier to the boundary node.

18. The tangible, non-transitory, computer-readable medium storing program instructions as in claim 15, wherein a graph computation element determines boundaries of the first zone and the second zone.

* * * * *